United States Patent

[11] 3,601,345

[72] Inventor Kenneth W. Johnson
 4113 Lakeshore Drive, Rte 1, Jamestown, Ohio 45335
[21] Appl. No. 736,745
[22] Filed June 13, 1968
[45] Patented Aug. 24, 1971
 Division of Ser. No. 654,351, July 11, 1966, Pat. No. 3,337,167.
 Continuation-in-part of application Ser. No. 665,133, July 21, 1967, now Patent No. 3,417,950, dated Dec. 24, 1968, which is a continuation-in-part of application Ser. No. 402,587, Oct. 8, 1964, now Patent No. 3,288,405, dated Nov. 29, 1966, which is a continuation-in-part of application Ser. No. 177,037, Mar. 2, 1962, now abandoned. This application June 13, 1968, Ser. No. 736,745

[54] ADJUSTABLE VIBRATION ISOLATER
 3 Claims, 7 Drawing Figs.
[52] U.S. Cl. ................................................ 248/24, 248/188.9
[51] Int. Cl. ................................................ F16f 3/10
[50] Field of Search ................................... 248/24, 188.4, 188.9, 358, 362, 363; 267/1; 16/30

[56] References Cited
UNITED STATES PATENTS

| | | | |
|---|---|---|---|
| 611,260 | 9/1898 | Lamoureux | 248/188.4 |
| 1,123,960 | 1/1915 | Von Derlin | 248/188.4 |
| 2,602,616 | 7/1952 | Helmond | 248/24 |
| 2,607,590 | 8/1952 | Wheaton | 248/24 UX |
| 2,778,628 | 1/1957 | Johnson | 267/1 |
| 2,921,760 | 1/1960 | Wheeler | 248/24 |
| 3,332,647 | 7/1967 | Young | 248/24 |
| 2,009,721 | 7/1935 | Williams | 248/363 UX |
| 2,155,341 | 4/1939 | Wayne | 248/362 |

FOREIGN PATENTS

| | | | |
|---|---|---|---|
| 637,263 | 5/1950 | Great Britain | 248/358 |

Primary Examiner—Roy D. Frazier
Attorney—Irvin V. Gleim

ABSTRACT: A vibration isolating and friction gripping device having resilient spring elements in frictional interengagement during operating conditions including means for changing the spring rate either through the use of resilient elements of differing spring rates or the use of concave washers of differing sizes. The device also includes a movable dial to provide leveling adjustability of an object mounted on the device without requiring lifting of the object by other means.

PATENTED AUG24 1971

INVENTOR.
KENNETH W. JOHNSON
BY
ATTORNEY

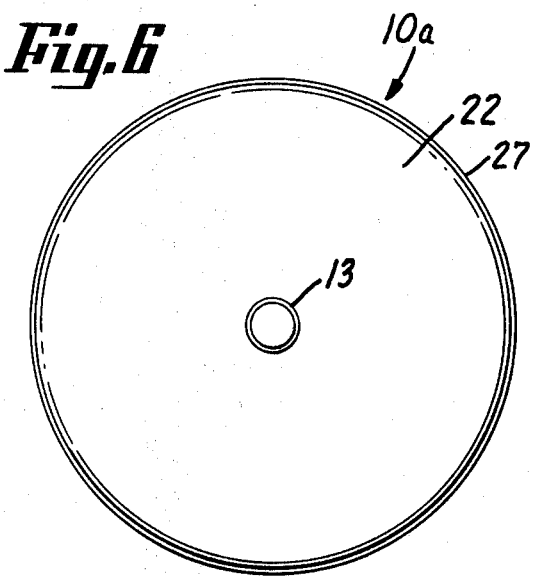
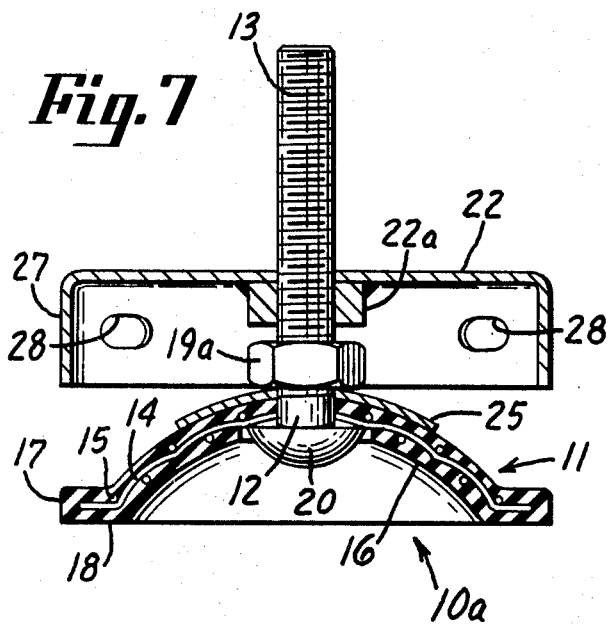

3,601,345

ADJUSTABLE VIBRATION ISOLATER

CROSS-REFERENCES TO RELATED APPLICATIONS

This application is a continuation-in-part of copending application Ser. No. 665,133 filed July 21, 1967 for "Vibration Isolator," now U.S. Pat. No. 3,417,950 issued Dec. 24, 1968, which was a division of a prior application Ser. No. 564,351 filed July 11, 1966 for "Vibration Isolator," now U.S. Pat. No. 3,337,167 issued Aug. 22, 1967, which, in turn, was a continuation-in-part of an earlier application Ser. No. 402,587 filed Oct. 8, 1964 for "Vibration Isolator," now U.S. Pat. No. 3,288,405 issued Nov. 29, 1966, which earlier application was a continuation-in-part of a prior application Ser. No. 177,037 filed Mar. 2, 1962 for "Vibration Isolator and Gripping Device," now abandoned.

FIELD AND SUMMARY OF THE INVENTION

The present invention relates to a vibration-isolating and friction gripping device for reducing the transmissibility of vibration from an object supported thereon and for simultaneously gripping a supporting surface.

In general, there is provided a vibration isolator device having a support surface and having connected thereto an elongated member, the distal end portion of which is provided with suitable means for connection to an object to be mounted thereon. Additionally, there is provided a member rotatable about the longitudinal axis of the elongated member for adjustable positioning of said member relative to the support surface of the device or an object supported by the device so as to change the loading or supporting area. Additionally, provision is made for modifying the spring rate of the vibration isolator portion of the device through the use of concave washers of differing sizes.

A primary object of the invention is to provide a novel resilient mounting for business machines, test equipment, electronic equipment and the like and which, when attached to such device or machine, provides correct spring strength or rate at a loading point so that vibration of the device or machine is absorbed or dissipated by such mounting, thus reducing the transmissibility of the vibration.

Another object of the invention is to provide a vibration isolating mounting which is readily adaptable for use with devices or certain machines of differing rates, sizes and vibration factors by use of resilient elements having differing spring rates and/or by utilization of concave washers of differing sizes to modify the spring rate of such resilient elements.

A further object of the invention is to provide a vibration isolating mounting including a resilient device and means for connecting the mounting to an object and having means readily operable independent of the resilient device to adjustably position such an object relative to a supporting surface.

A further object is to provide a device of the character described which may be fitted directly to certain machines and equipment to provide the synergistic vibration-absorbent frictionally engaging action whereby such machines and equipment cause the device to expand under load and thus exert increasing frictional engagement or gripping action relative to a supporting surface as the spring component of the device spreads under increased loading.

DESCRIPTION

Other objects of the invention will become apparent from the following specification taken in conjunction with the accompanying drawings in which:

FIG. 6 is a plan view of an embodiment of a device of this invention generally designated in FIG. 2; and, FIG. 7 is an enlarged sectional view of the embodiment of a device of the present invention generally designated in FIGS. 2 and 6.

Similar reference characters refer to similar parts throughout the several views of the drawing.

Figure 1:
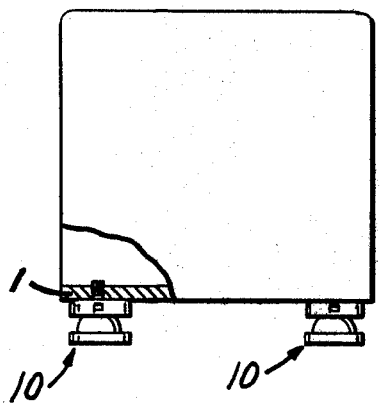
FIG. 1 is an elevational view, partly in section, illustrating a plurality of units of the present invention supporting an object mounted thereon.
Figure 2:
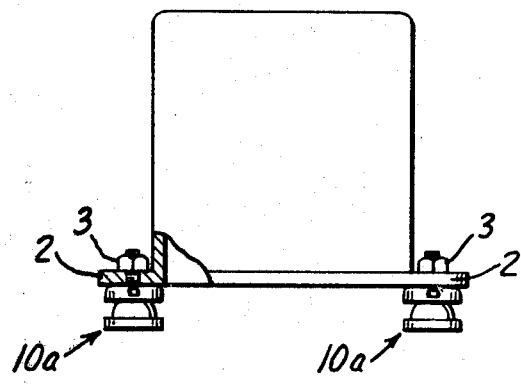
FIG. 2 is an elevational view illustrating a modification of FIG. 1.

With reference to FIG. 1, certain machines and/or equipment such as washers, dryers, typewriters, business machines, etc. are provided with internal nut plate to facilitate the mounting of such devices by means of bolts or screws. As is shown in FIG. 2, certain other machines and equipment are provided with an external flange 2 having clearance holes therein for the mounting and securing of such devices by means of screws or bolts.

Referring to the drawings, a mounting in accordance with the present invention is generally designated by numeral 10 and includes a mounting foot portion 11 and an upright member 12 having a threaded portion 13 of suitable size for being threadedly received by nut plate 1.

Figure 5:
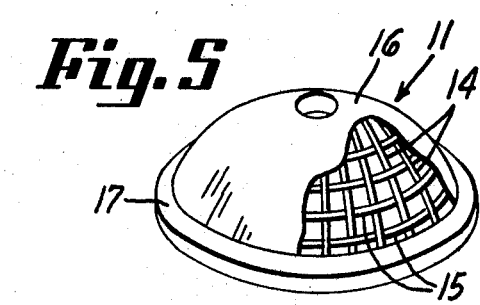
FIG. 5 is a perspective view, partially broken away, of the vibration isolator portion of the invention.
Figure 3:
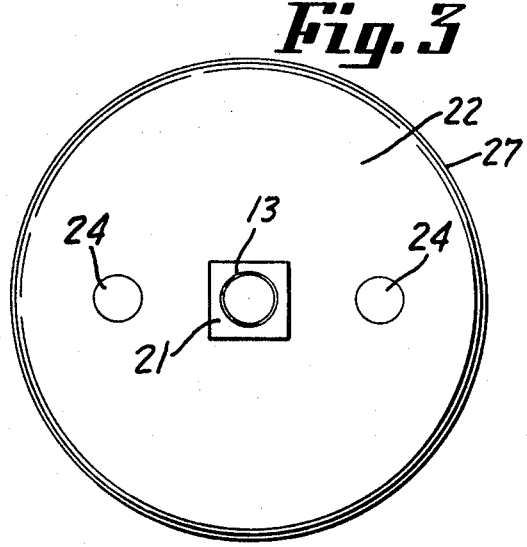
FIG. 3 is a plan view of one embodiment of a device of the present invention generally designated in FIG. 1.

As is best illustrated in FIG. 5, the foot portion 11 is a composite of a plurality of individual members or elements 14, 15 connected together to provide a unitary member which functions in a springlike manner. Elements 14 and 15 are formed of a yieldable metal material and preferably are formed of wire-screenlike material or of woven metal cloth with the individual elements 14, 15 of concave-convex shape and angularly disposed relative to one another so that each individual element constitutes in itself a spring and because of the interweaving of such elements, each foot portion 11 constitutes a plurality of springs in itself. Foot portion 11 and its elements 14, 15 are molded and encased within a casing 16 of rubber or rubberlike material having resiliency characteristics so that the composite of foot member 11 and casing 16 likewise constitutes a plurality of interconnected springlike members.

In an ordinary spring, made of metal wire, the spring rate or gradient is a function of a diameter of the spring wire. Similarly, the spring rate or gradient of a rubber springlike member is a function of the relative hardness or softness of the material. In accordance with the present invention, the coaction of elements 14, 15 and the material of casing 16 is such that the foot portion 11 constitutes a composite spring, the spring rate or gradient of which is a function of the diameter or diameters of elements 14, 15, the hardness of material of casing 16, and additionally is varied and/or modified because of the presence of casing material encompassed within the quadrilateral structure formed between adjacent pairs of interwoven elements 14, 16 which material must be compressed in one direction and elongated in an opposite direction in order to deflect the composite spring.

As a vibration isolator, the structure of composite foot 11 also modifies the friction damping characteristics of interwoven elements 14, 15. The presence of the casing material encompassed within the quadrilateral structure provides a very substantially increased damping characteristic as compared to the relatively small amount of damping obtainable from mere interweaving of elements 14, 15.

An integral annular flange 17 having a flat bottom surface 18 surrounds the bottom of foot member 11 and provides a frictional gripping surface, the grip of which is increased in accordance with an increase of pressure applied at the top of the concave-convex foot member. A central opening at the apex of the foot member and extending through the casing material 16 accommodates a rivet 19 for securing the foot portion 11 to other portions of the mounting 10.

Figure 4:
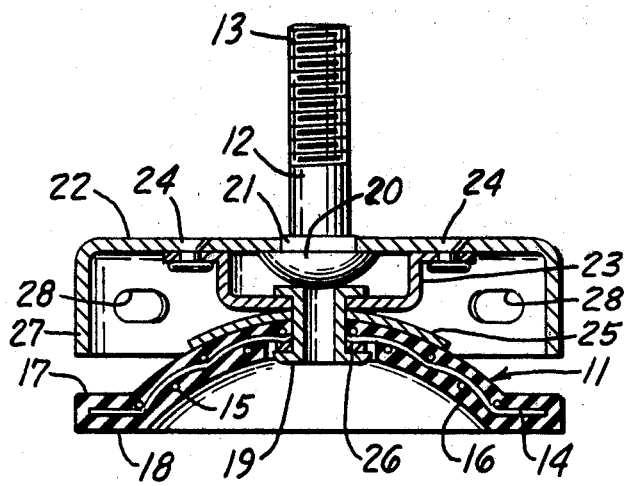
FIG. 4 is an enlarged sectional view of a device of this invention shown in FIGS. 1 and 3.

As is best shown in FIG. 4, dial member 22 is integrally connected to or joined with member 12. In one way of achieving such connection, for example, dial or disclike member 22 is provided with a central square opening to admit square shoulder 21 and to retain the enlarged head portion 20 of member 12. A support bracket 23 of general U-shaped cross section as shown in FIG. 4 is secured to the underside of dial or disclike member 22 by rivets 24. The enlarged head portion 20 is retained between the underside of dial or disclike member 22 and bracket 23 which is also secured to the foot portion 11 by rivet 19.

In the event that it is desired to provide differing spring rates to accommodate machines of different sizes, weights and vibration factors, a foot portion 11 having a different composite spring rate may be employed. Alternatively, it may be desirable to employ more or less standardized foot portions 11 and to modify the composite spring rate thereof to accommodate different machines. This is accomplished in accord with the invention by interposing between bracket 23 and foot portion 11 a concave washer 25 which substantially matches the domelike shape of foot portion 11. In this manner, various load ranges can be accommodated by use of such concave washers in differing sizes to provide contact areas and thus modify the spring rate by changing the loading area. Also, if desired, a washer 26 may be interposed between the underside of foot portion 11 and rivet 19.

From the foregoing, use and operation of the device will be evident. To utilize the device of the present invention on a particular machine or equipment, threaded portion 13 of mounting 10 is screwed into nut plate 1 of the machine or equipment to be supported thereby, using as many mountings 10 as may be required and provided for in nut plate 1 of the machine or equipment. The machine or equipment with mounting 10 thus installed is then placed upon a supporting surface with surface 18 of foot portion 11 in contact with such supporting surface. Any adjustments that may be required in order to level the machine or equipment are readily and easily effected merely by rotating dial or disclike member 22. Because member 22 is integrally connected to member 12, such rotation advances or retracts threaded portion 13 into or away from nut plate 1 of the machine or equipment. If desired, dial or disclike member 22 may be provided with a depending flange 27 having openings 28 therein for receiving a tool to facilitate rotation of dial 22. Additionally, it is contemplated that flange 27 may be provided with a gripping surface such as a rubber ring or the like to further facilitate hand rotation of dial 22. Thus, the machine or equipment may be readily raised or lowered by effecting rotation of the dial without lifting the machine or equipment by other means.

In the modification shown in FIGS. 2, 6 and 7, member 12 is inserted through the central opening of foot portion 11 and rivet 19 is replaced by a nut 19a which is threadly engaged with the threaded portion 13 of member 12 to secure it to foot portion 11. Additionally, bracket 23 is replaced by a nut 22a which may be welded or otherwise joined to the dial or disclike member 22 so that rotation thereof results in its advance or retraction relative to the threaded portion 13. Such modified mountings are generally designated by numeral 10a, and except for such differences, are identical with mountings 10. Use and operation of mountings 10a is generally similar to that described above. However, mountings 10a are installed by inserting the threaded portion 13 through the clearance hole provided in an external flange 2 of the equipment to be mounted thereon and securing the mounting 10a by a nut 3 which threadedly engages threaded portion 13 as best shown in FIG. 2. If a leveling adjustment is required, such adjustment is made by rotating dial or disclike member 22 which results in its upper surface being raised or lowered depending upon the direction of rotation, thereby raising or lowering the machine resting thereon. Upon completion of the leveling adjustment, the mounting unit is secured by securing nut 3 as noted heretofore.

While particular embodiments of the invention have been illustrated and described, it will be appreciated by those skilled in the art that various changes and modifications may be made without departing from the invention and it is intended to cover in the appended claims all such changes and modifications that fall within the true spirit and scope of the invention.

What I claim is:

1. A vibration isolating device for dissipating vibration while supporting an object comprising in combination a concavo-convex composite spring member having an annular flange extending peripherally outward from the concavo-convex portion thereof, said flange having a substantially flat bottom surface expandable when subjected to load and adapted to grippingly engage a support surface, said composite spring member including a plurality of resilient wirelike members interwoven with each wirelike member frictionally engaging other such wirelike members and spaced apart with adjacent pairs of said wirelike members defining interstices therebetween, and a deformable casing member of resilient material disposed in said interstices and enclosing said wirelike members and cooperatively engaged therewith, said wirelike members and said casing member coacting synergistically and modifying their individual spring gradients and frictional damping characteristics, said composite spring member additionally including means carried by said composite member for connecting thereto an object to be supported thereby, and positioning means rotatable relative to said connecting means for adjustably positioning an object relative to said bottom surface while said object is supported by said device with said bottom surface disposed on a supporting surface.

2. Device according to claim 1 and additionally including additional spring gradient modifying means comprising a washer of concavo-convex shape substantially conforming with said concavo-convex portion of said composite member and disposed between said composite member and said connecting means.

3. Device according to claim 1 wherein said connecting means includes an elongate member having a threaded portion, and said positioning means includes an upper surface for supporting said object.